No. 621,786. Patented Mar. 28, 1899.
S. M. BOYER.
WATER FILTER.
(Application filed July 8, 1898.)
(No Model.)
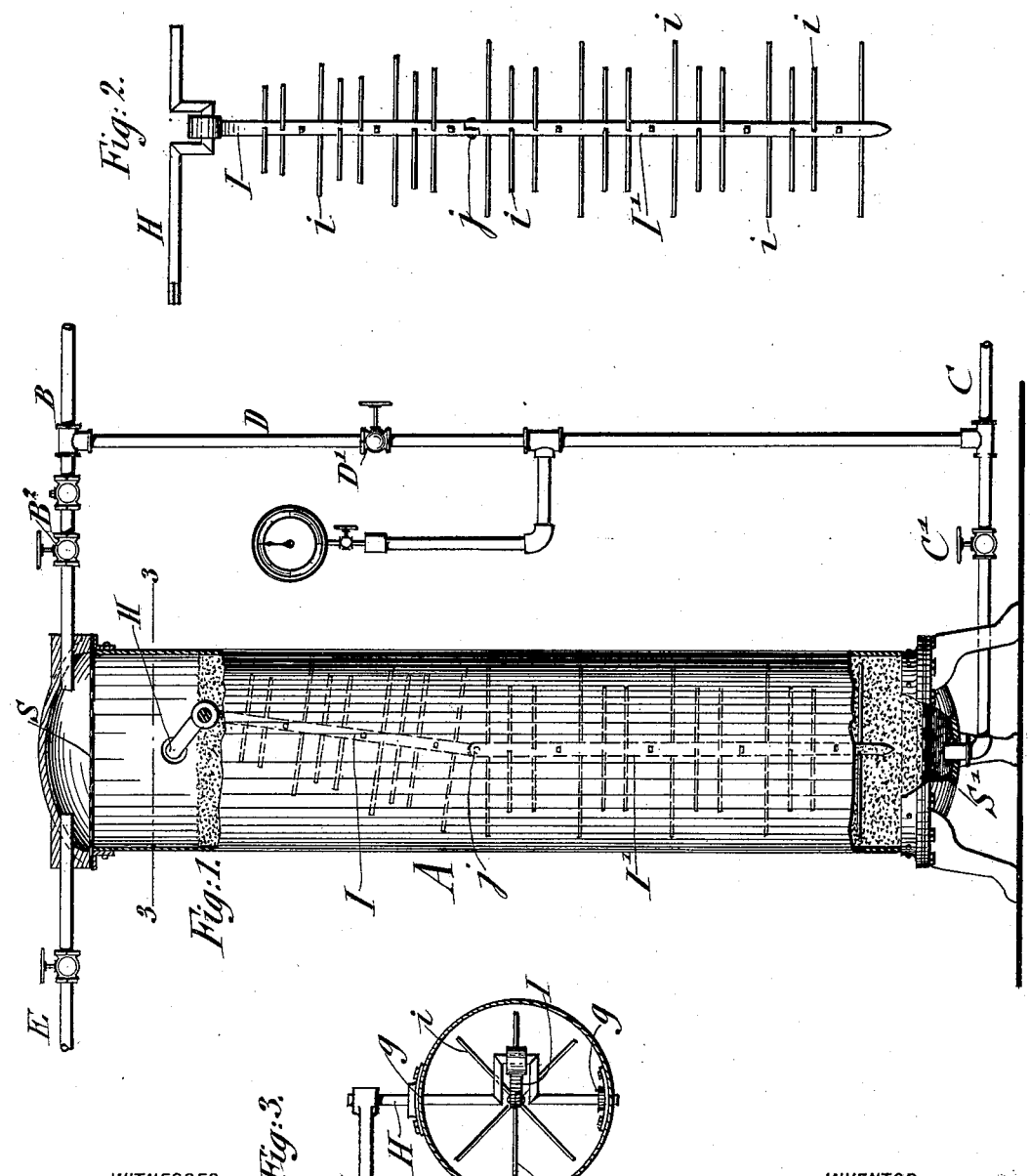
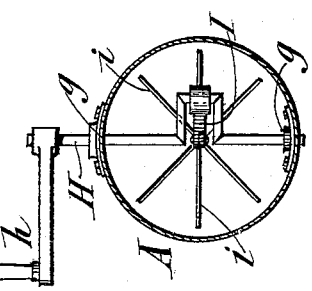
WITNESSES:
INVENTOR
Seaton M. Boyer
BY
ATTORNEYS.

UNITED STATES PATENT OFFICE.

SEATON M. BOYER, OF ALLENTOWN, PENNSYLVANIA.

WATER-FILTER.

SPECIFICATION forming part of Letters Patent No. 621,786, dated March 28, 1899.

Application filed July 8, 1898. Serial No. 685,408. (No model.)

*To all whom it may concern:*

Be it known that I, SEATON M. BOYER, a citizen of the United States, residing at Allentown, in the county of Lehigh and State of Pennsylvania, have invented certain new and useful Improvements in Water-Filters, of which the following is a specification.

This invention relates to water-filters, but more particularly to an agitating-attachment for water-filters, the object of the same being to provide means for mechanically and thoroughly agitating or stirring up the filtering material contained in the filtering-tank, so that foreign bodies which have been intercepted by the filtering material will be detached or loosened therefrom and the more readily carried off when cleaning the filter.

My invention consists of certain features of construction and combinations of parts to be hereinafter described and then claimed.

In the accompanying drawings, Figure 1 is a sectional side elevation of a water-filter embodying my improvement. Fig. 2 is a detached side view of the agitating attachment; and Fig. 3 is a transverse section on line 3 3, Fig. 1.

Similar letters of reference indicate corresponding parts.

Referring to the drawings, A represents a suitable tank, B an inlet-pipe, and C an outlet-pipe leading, respectively, to the top and bottom of the tank. At the top and bottom of the tank are perforated screens S S' for holding the filtering material in place. The inlet-pipe is connected to the outlet-pipe C by a connecting-pipe D. Valves $B^2$, D', and C' are arranged in the inlet-pipe B, connecting pipe D and outlet-pipe C, so that by opening the valves $B^2$ and C', with D' closed, the water to be filtered passes down through the mass of filtering material in the tank A and pure water passes off through the outlet-pipe C in the well-known manner. To clean the filtering material of foreign substances separated from the water by the same, the valve $B^2$ is closed and valves C' and D' opened, so that by a reverse current passing up through the filtering material the water effectually takes along with it the foreign substances and carries the same out through the valved outlet E for the impure or cleansing water. So much of the filter is known; but the present invention relates to a mechanical agitator whereby the filtering material is thoroughly stirred up and agitated while the cleansing-water is passing through, so that all of the foreign particles detached are carried off.

In carrying out my invention diametrically opposite bearings $g$ are provided in the upper part of the tank A, and in these the crank-shaft H turns, said shaft having outside the tank a hand-crank $h$. A rod or shank composed of two sections I I' is pivoted to and hung from the cranked portion of the shaft H, so as to extend nearly to the bottom of the tank, and from these sections extend radial agitator arms or blades $i$, which are arranged in any suitable manner—as, for instance, spirally around and upon the said sections. The said sections I I' are hinged or pivoted together at $j$, and inasmuch as the arms on the lower section I' are somewhat longer than those on the upper section I' the rotation of the hand-crank $h$ will impart a straight up-and-down reciprocating motion to said lower section, while a rocking or wabbling motion will be imparted to the upper section. This motion is imparted while the cleansing-water is being passed upwardly through the filter. It will be understood that the heavier and coarser particles of foreign matter will in filtering have been detained by the filtering material at the upper part of the tank in which the upper wabbling section of the agitator attachment is arranged, and for this reason the attachment is composed of pivoted parts, so that a more vigorous stirring up of that portion of the filtering material may be effectuated. As less foreign matter is detained by the lower mass of filtering material, a simple reciprocatory motion is imparted to the lower section.

The radial arms on the depending agitator thoroughly detach all foreign particles and enable the cleansing-water to thoroughly and effectively clean out or wash the filtering material preparatory to filtering again.

The attachment can readily be applied to filters of the type shown, as it is only necessary to mount the bearings at the upper part of the tank before putting in the attachment. Consequently the attachment can be sold either together with the other parts of the filtering apparatus or independently.

Having thus described my invention, I claim as new and desire to secure by Letters Patent—

1. An agitating attachment for filtering apparatus, consisting of a hinge-jointed rod or shank provided with radial agitator-arms, substantially as set forth.

2. An agitating attachment for filtering apparatus, consisting of a cranked shaft, a hinge-jointed rod or shank hung on the cranked portion of the shaft, and radial arms on said rod, substantially as set forth.

3. In combination with a water-filtering tank, and means for supplying cleansing liquid thereto, a reciprocating agitator arranged in the tank and having a wabbling or rocking upper section, and means for reciprocating said agitator, substantially as set forth.

4. In combination with a water-filtering tank, and means for supplying cleansing liquid thereto, a reciprocating agitator arranged in the tank and composed of pivoted sections provided with radial arms, and means for reciprocating said agitator, substantially as set forth.

In testimony that I claim the foregoing as my invention I have signed my name in presence of two subscribing witnesses.

SEATON M. BOYER.

Witnesses:
GEO. L. WHEELOCK,
M. HENRY WURTZEL.